(12) United States Patent
Gane et al.

(10) Patent No.: US 9,017,631 B2
(45) Date of Patent: Apr. 28, 2015

(54) PROCESS TO PREPARE PRECIPITATED CALCIUM CARBONATE IMPLEMENTING LOW CHARGE ACRYLATE A/O MALEINATE-CONTAINING POLYMER

(75) Inventors: Patrick Arthur Charles Gane, Rothrist (CH); Matthias Buri, Rothrist (CH); Michael Pohl, Villach (AT)

(73) Assignee: Omya International AG, Oftringen (CH)

( * ) Notice: Subject to any disclaimer, the term of this patent is extended or adjusted under 35 U.S.C. 154(b) by 1004 days.

(21) Appl. No.: 12/737,595

(22) PCT Filed: Aug. 4, 2009

(86) PCT No.: PCT/IB2009/006431
§ 371 (c)(1),
(2), (4) Date: Mar. 18, 2011

(87) PCT Pub. No.: WO2010/018432
PCT Pub. Date: Feb. 18, 2010

(65) Prior Publication Data
US 2011/0158890 A1 Jun. 30, 2011

Related U.S. Application Data

(60) Provisional application No. 61/100,319, filed on Sep. 26, 2008.

(30) Foreign Application Priority Data

Aug. 13, 2008 (EP) .................................... 08014443

(51) Int. Cl.
*C01F 11/18* (2006.01)
*C01F 11/02* (2006.01)
(Continued)

(52) U.S. Cl.
CPC ............... *C09C 1/021* (2013.01); *C01F 11/183* (2013.01); *C01P 2004/03* (2013.01);
(Continued)

(58) Field of Classification Search
None
See application file for complete search history.

(56) References Cited

U.S. PATENT DOCUMENTS 6,251,356 B1 * 6/2001 Mathur .......................... 423/432
8,263,819 B2 * 9/2012 Kensicher et al. ............. 588/315
(Continued)

FOREIGN PATENT DOCUMENTS

CN 1631789 A 12/2002
CN 1724378 A 6/2005
(Continued)

OTHER PUBLICATIONS

Esp@cenet patent family listing for FR 2911147. Viewed Jan. 15, 2014 at http://worldwide.espacenet.com/publicationDetails/inpadocPatentFamily?CC=FR&NR=2911147A1&KC=A1&FT=D& ND=3&date=20080711&DB=EPODOC&locale=en_EP.*
(Continued)

*Primary Examiner* — Stanley Silverman
*Assistant Examiner* — Daniel Berns
(74) *Attorney, Agent, or Firm* — Amster, Rothstein & Ebenstein LLP

(57) ABSTRACT

Process to prepare a precipitated calcium carbonate (PCC) comprising the following steps: (i) providing CaO, which is optionally partially or fully slaked (hereafter "calcium source"); (ii) providing a $CO_2$-comprising gas; (iii) contacting said calcium source of step (i) and said $CO_2$-comprising gas of step (ii) in an aqueous environment in a reactor, in one or more steps; (iv) obtaining a PCC-comprising suspension; (v) optionally concentrating said PCC-comprising suspension of step (iv); (vi) optionally adding dispersing additives to the suspension of step (iv) and/or (v); (vii) optionally grinding the product of step iv, v or vi.

37 Claims, 4 Drawing Sheets

(51) Int. Cl.
| | |
|---|---|
| *B01D 53/62* | (2006.01) |
| *B01D 53/78* | (2006.01) |
| *C09C 1/02* | (2006.01) |
| *C09D 7/12* | (2006.01) |
| *D21H 19/68* | (2006.01) |
| *C08K 3/26* | (2006.01) |
| *D21H 17/37* | (2006.01) |
| *D21H 17/67* | (2006.01) |
| *D21H 19/38* | (2006.01) |

(52) U.S. Cl.
CPC ........ *C01P 2004/61* (2013.01); *C01P 2006/12* (2013.01); *C01P 2006/22* (2013.01); *C08K 3/26* (2013.01); *C09D 7/1216* (2013.01); *D21H 17/37* (2013.01); *D21H 17/675* (2013.01); *D21H 19/385* (2013.01); *D21H 19/68* (2013.01); *C01P 2004/10* (2013.01)

(56) References Cited

U.S. PATENT DOCUMENTS

| | | | |
|---|---|---|---|
| 2003/0147799 A1* | 8/2003 | Spaepen | 423/432 |
| 2003/0180208 A1 | 9/2003 | Yaniv | |
| 2009/0309553 A1 | 12/2009 | Marinka-Toth et al. | |
| 2010/0121127 A1 | 5/2010 | Kensicher et al. | |
| 2011/0135560 A1* | 6/2011 | Guillot et al. | 423/432 |

FOREIGN PATENT DOCUMENTS

| | | | |
|---|---|---|---|
| EP | 0 468 719 A | | 1/1992 |
| FR | 2 911 147 A | | 7/2008 |
| WO | 0107365 A1 | | 2/2001 |
| WO | WO 2004/106236 A | | 12/2004 |
| WO | WO 2005/000742 A | | 1/2005 |
| WO | 2007125403 A1 | | 11/2007 |
| WO | WO 2007/130344 | * | 11/2007 |
| WO | WO 2008/047220 A1 | | 4/2008 |

OTHER PUBLICATIONS

The Written Opinion of the International Searching Authority for PCT Application No. PCT/IB2009/006431.

The European Search Report dated Feb. 13, 2009 for European Application No. 08014443.9.

Jin Xin et al. Preparation of ultrafine poweders of CaCO3, Journal of Beijing University of Chemical Technology, 27 (4), 2000, p. 79-82.

The International Search Report dated Nov. 17, 2009 for PCT Application No. PCT/IB2009/006431.

The Written Opinion of the International Searching Authority for PCT Application No. PCT/IB2009/006431, Report mail date: Nov. 17, 2009.

Garcia-Carmona et al. "Morphological characteristics and aggregation of calcite crystals obtained by bubbling CO2 through a Ca(OH)2 suspension in the presence of additives." Powder Technology, vol. 130 (2003), pp. 307-315.

* cited by examiner

PROCESS TO PREPARE PRECIPITATED CALCIUM CARBONATE IMPLEMENTING LOW CHARGE ACRYLATE A/O MALEINATE-CONTAINING POLYMER

This is a U.S. national phase of PCT Application No. PCT/IB2009/006431, filed Aug. 4, 2009, which claims priority to European Application No. 08014443.9, filed Aug. 13, 2008, and U.S. Application No. 61/100,319, filed Sep. 26, 2008.

BACKGROUND OF THE INVENTION

Synthetic calcium carbonate, referred to hereafter as precipitated calcium carbonate (PCC), is a known filler and coating pigment, particularly implemented in paper applications. It is obtained by hydration of calcium oxide (CaO), or "burnt lime", forming a suspension of calcium hydroxide ($Ca(OH)_2$); this hydration step is also referred to as a step of "slaking lime". The obtained calcium hydroxide is thereafter precipitated by bubbling $CO_2$ gas through the suspension, to form PCC.

Depending on the precipitation conditions, various polymorphs of PCC may be obtained, including aragonitic and scalenohedral polymorphs. The nature of the polymorph is generally determined based on analysis of scanning electron microscope (SEM) images of the product, aragonite crystal being generally needle-shaped as opposed to the ovoid form of scalenohedral products.

The skilled man refers to the PCC production capacity in terms of the weight of PCC produced relative to both the carbonation time and the weight of the final PCC suspension. Increasing this production capacity, namely by decreasing the carbonation time without overly increasing the final PCC suspension weight through addition of water to limit suspension viscosity, represents a goal of significant economical interest.

For the purpose of the present invention, carbonation time is the time from the start of introduction of $CO_2$-containing gas to a calcium source in suspension to reaching a minimum suspension conductivity.

A number of studies have addressed decreasing carbonation time, including WO 01 07365, in which this is said to be achieved by reducing the carbonation reactor pressure, through which $CO_2$ gas is bubbled, to below atmospheric pressure. However, this approach implies costly modifications to the PCC production equipment.

Additives are also known to be implemented during the PCC production process in order to reduce carbonation time. According to <<Change of formation yield and characterization of PCC particle synthesized with impurity ions by carbonation process>> (Materials Science Forum, 510-511, March 2006, pp. 1026-1029), this is achieved by addition of ions, such as aluminium, iron and magnesium; however, the crystallographic structure, or polymorph, of the resulting PCC differs relative to the PCC that would be obtained via a process excluding these ions.

In <<Morphological characteristics and aggregation of calcite crystals obtained by bubbling $CO_2$ through $Ca(OH)_2$ suspension in the presence of additives>> (Powder Technology, 130, 2003, pp. 307-315), the addition of citric acid, sucrose or calcium lignosulfonate to a suspension of slaked lime prior to the carbonation process is remarked to significantly extend carbonation time, whereas polyethylene glycol (of molecular weight 300 g/mol) is proposed to decrease this time. However, as shown in the Examples section herebelow, processes implementing polyethylene glycols fail to provide the improvement in PCC production capacity provided by the process of the present invention.

Lastly, WO 2005/000742 and WO 2004/106236 disclose a PCC production process in which a polyacrylate and polyphosphate are added prior to completion of the carbonation reaction. These documents fail to refer to any influence these additives might have on carbonation time. Indeed, as shown in the Examples herebelow, PCC production processes implementing such simple polyacrylates do not allow the same, advantageous improvement in PCC production capacity as do the processes of the present invention. Additionally, these documents clearly suggest that the crystallographic PCC structures obtained in the presence of the mentioned additives differ from that obtained in their absence.

As such, the skilled man has no leading line suggesting a process to solve the problem of improving the PCC production capacity, namely by reducing carbonation time, subject to the following constraints:
  to identify a chemical additive allowing the carbonation time to be reduced without requiring extensive and often costly modifications to be made to his production equipment;
  to identify a chemical additive that does not change the crystallographic structure of the obtained PCC relative to the structure obtained by the same process but in absence of said additive;
  to identify a chemical additive that does not lead to overly high PCC suspension viscosities, requiring the addition of significant amounts of dilution water, said dilution water being a limiting factor in the PCC production rate;
  to identify a chemical additive that leads to an aqueous suspension featuring a high PCC solids content, the solids being among the factors contributing to the overall production costs of the PCC material.

SUMMARY OF THE INVENTION

In response to this multi-faceted technical problem, the Applicant has surprisingly identified a process to prepare a precipitated calcium carbonate (PCC) comprising the following steps:
(i) providing CaO, which is optionally partially or fully slaked (hereafter "calcium source");
(ii) providing a CO2-comprising gas;
(iii) contacting said calcium source of step (i) and said CO2-comprising gas of step (ii) in an aqueous environment in a reactor, in one or more steps;
(iv) obtaining a PCC-comprising suspension;
(v) optionally concentrating said PCC-comprising suspension of step (iv);
(vi) optionally adding dispersing additives to the suspension of step (iv) and/or (v);
(vii) optionally grinding the product of step iv, v or vi; characterised in that:
  at least one polymer resulting from the polymerisation of the following monomers, where such monomers are present in said polymer in the following % monomer units relative to the total monomer units forming said polymer, is present during step (iii):
a) from 10% to 99%, preferably from 50% to 98%, more preferably from 80% to 97%, and even more preferably from 85% to 95%, of at least one vinyl group-comprising monomer not comprising Formula (I),
b) from 1% to 90%, preferably from 2% to 50%, more preferably from 3% to 20%, and even more preferably from 5% to 15%, of at least one vinyl group-comprising monomer having at least one substituent comprising Formula (I):

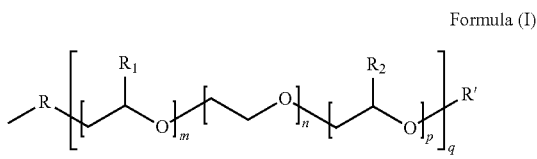

Formula (I)

wherein:
  m, n, p and q are whole numbers having a value of less than 150, and at least one of m, n, p and q has a value of greater than 0, such that $25 \leq (m+n+p)q \leq 150$, and preferably such that $50 \leq (m+n+p)q \leq 150$;
  R represents a functional linking group selected from ethers, esters or amides,
  $R_1$ and $R_2$ are the same or different, and represent hydrogen or alkyl groups having 1 to 4 carbon atoms,
  R' represents hydrogen or a hydrocarbon radical having 1 to 40, preferably 1 to 3, carbon atoms, R' being even more preferably a methyl radical or hydrogen, the sum of the monomer unit percentages of monomers a) and b) being equal to 100%.

The Applicant would like to mention FR 2,911,147, which discloses the use of similar polymers for the dispersing of metal oxides and hydroxides; in this document, no mention is made of the use of such polymers in a process to produce PCC having a reduced carbonation time subject to the above-mentioned requirements of the skilled man. To the contrary, the proposed increase in calcium oxide hydration time in FR 2,911,147 would rather drive the skilled man not to implement such polymers in view of his goal to develop an efficient PCC production process.

DETAILED DESCRIPTION OF THE INVENTION

Figure 1A:
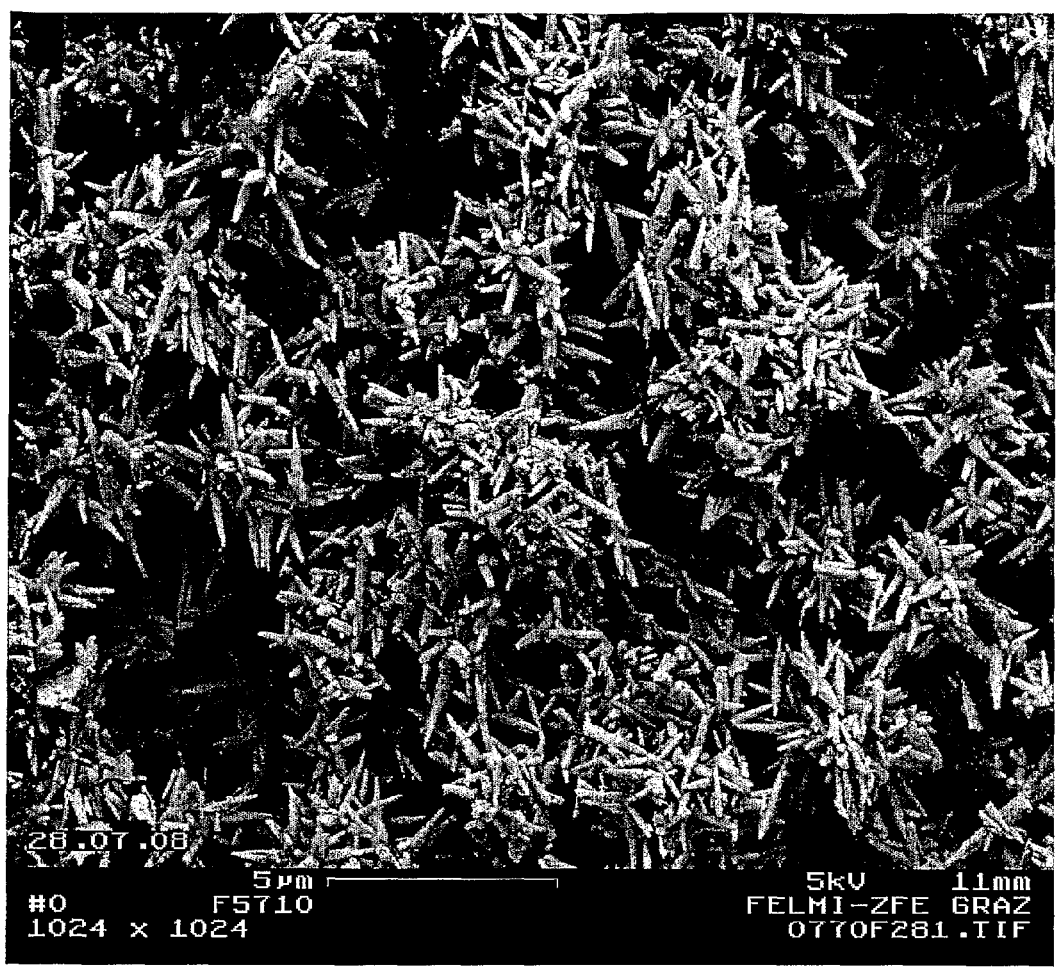
FIG. 1A and FIG. 1B (enlargement of FIG. 1A) show an SEM image of the obtained product of Test 9, featuring the typical needle shape of the aragonitic PCC polymorph.
Figure 1B:
Figure 2A:
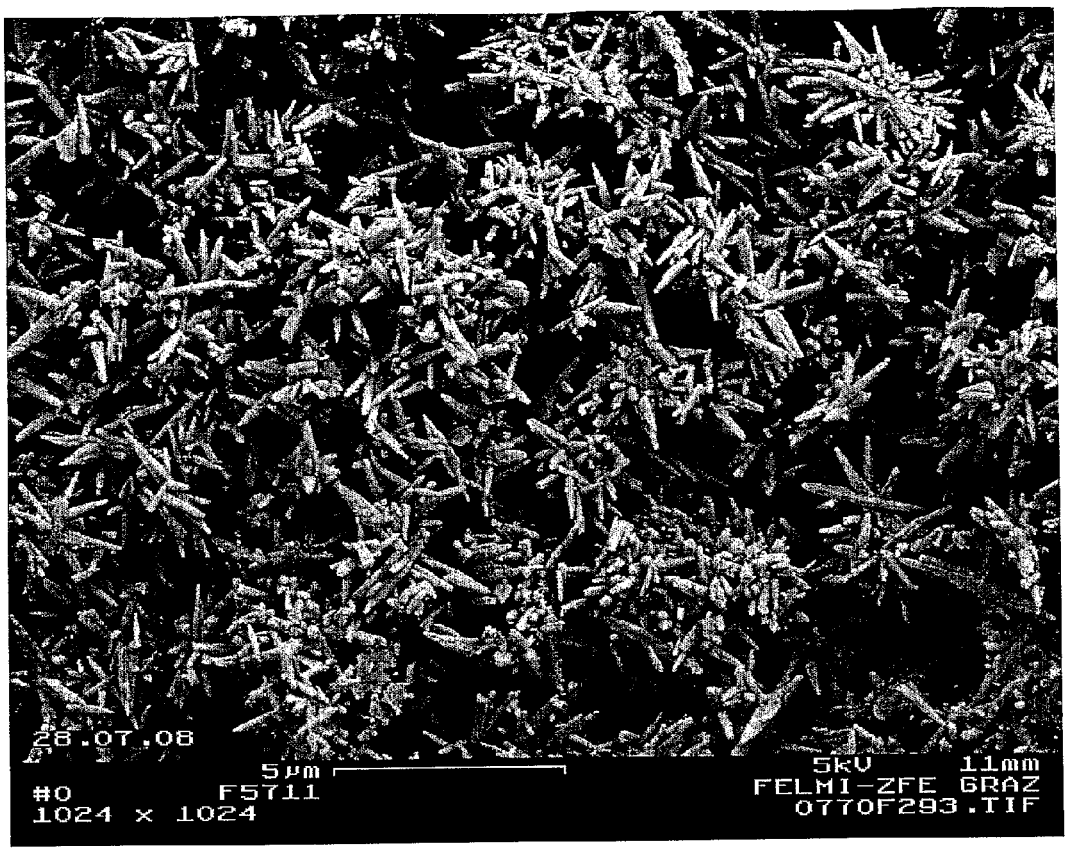
FIG. 2A and FIG. 2B (enlargement of FIG. 2A) show an SEM image of the obtained product of Test 10, featuring the typical needle shape of the aragonitic PCC polymorph.
Figure 2B:
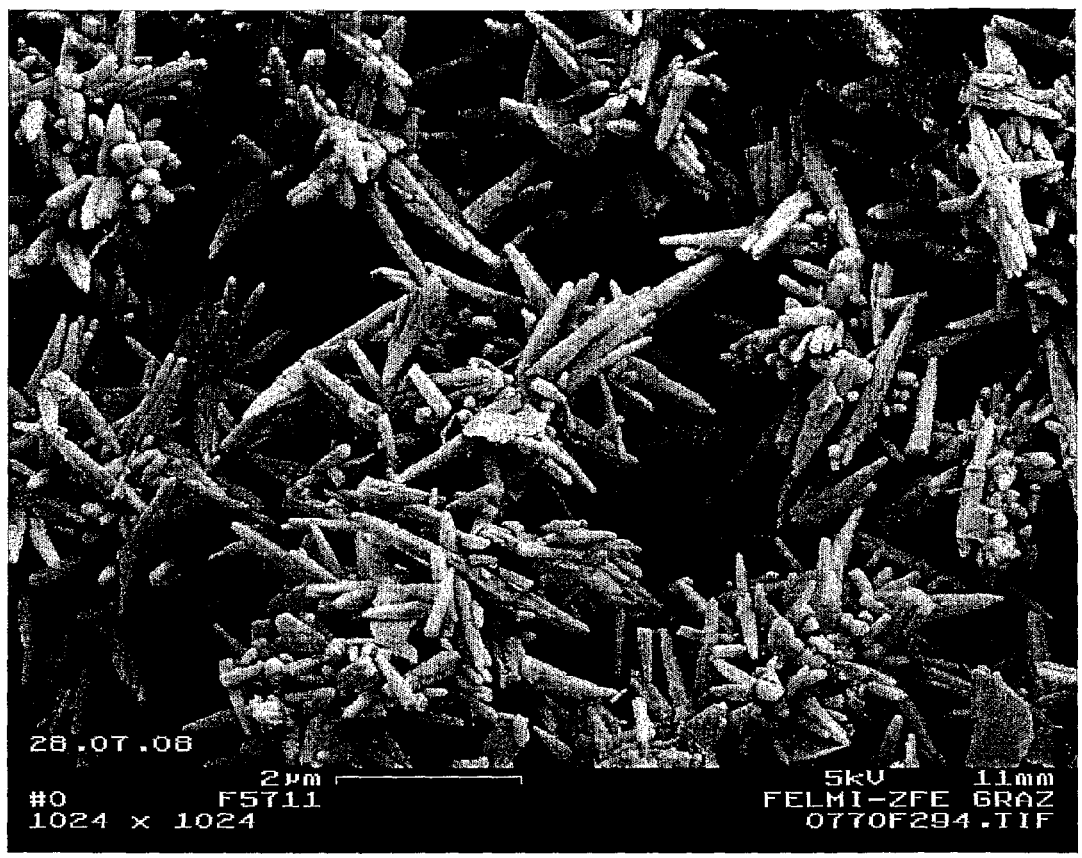

Preferred Embodiments Relative to the Polymer:

In a preferred embodiment, monomer(s) (a) are selected from among anionic monomers, such as acrylic, methacrylic or maleic acid, cationic monomers such as acrylamide, methacrylamide, neutral monomers such as acrylic, methacrylic or maleic acid esters, or mixtures thereof.

In a preferred embodiment, said monomer(s) (a) are a mixture of anionic and neutral monomer(s). In such a case, it is further preferred that the monomer unit ratio of anionic monomers:neutral monomers be from 50:50 to 2:1, more preferably of 8:1 to 12:1, and most preferably of 10:1.

In a preferred embodiment, said monomer(s) (a) are a mixture of anionic and neutral monomer(s) selected from among acrylic and/or methacrylic acids and esters thereof.

In the case where cationic monomers are selected, it is preferred that these be selected from among cationic (meth) acrylic esters, and preferably from among chloride and/or sulfate salts of one or more of the following: [2-(methacryloyloxy)ethyl]trimethyl ammonium, [3-acrylamido)propyl] trimethylammonium, dimethyl diallyl ammonium, [3-(methacrylamido)propyl]trimethylammonium.

As regards monomer(s) (b), these may additionally feature substituents not comprising Formula (I) selected from one or more of the following functional groups: alkyl, aryl, alkyl ester, hydrogen, alkyl amide, carboxyl and allyl, and preferably features at least one methyl substituent. In a preferred embodiment, monomer(s) (b) feature a methyl group in transposition relative to the substituent comprising Formula (I) in which said functional group linking is an ester.

In another embodiment, monomer(s) (b) have at least one substituent consisting of Formula (I).

It may further be of interest that said polymer features an intrinsic viscosity of less than or equal to 100 ml/g, as determined by the method described in "Outlines of macromolecular chemistry" volume III (Vollmert Verlag, Karlsruhe 1985), implementing a solution of double-distilled water and a capillary tube according to DIN 53101/0a (having a constant of 0.005 and a diameter of 0.53 mm).

Any dissociated acid groups in said polymer may be partially or fully neutralised by one or more neutralisation agents having a monovalent or polyvalent cation, said neutralisation agents being preferably selected from among ammonia or from among calcium, sodium, magnesium, potassium or lithium hydroxides or oxides, or from among primary, secondary or tertiary aliphatic and/or cyclic amines, and preferably from among stearyl amine, mono-, di- or triethanoamines, cyclohexylamine, methylcyclohexylamine, aminomethylpropanol, morpholine, said neutralisation agent being preferably sodium hydroxide.

Before or after any neutralisation reaction, said polymer may be treated and separated into multiple phases, by static or dynamic processes, by one or more polar solvents, said solvents being preferably selected from among water, methanol, ethanol, propanol, isopropanol, butanol, acetone, tetrahydrofuran, or mixtures thereof.

The polymer may be obtained via a process of radical polymerisation in solution, in direct or inverse emulsion, in suspension or by precipitation in solvents, in the presence of catalytic systems or transfer agents, or via a controlled radical polymerisation, preferably controlled by nitroxides (NMP) or by cobaloximes, or by Atom Transfer Radical Polymerisation (ATRP), by sulphur-derivative controlled radical polymerisation, selected from among carbamates, dithioesters or trithiocarbonates (Reversible Addition-Fragmentation chain Transfer or RAFT) or xanthates.

Preferred Embodiments Relative to the Polymer Addition Amount and Moment of Addition:

It is preferred that the polymer is added to the process in amount totaling 0.01 to 0.5, preferably 0.05 to 0.2% by dry weight relative to the dry weight of PCC obtained in step (iv).

Said polymer may be fractionated in doses added over time prior to and/or during step (iii).

Moreover, said polymer may be added during more than one of steps (i), (ii) and (iii).

It is preferred that 20, preferably 50, more preferably 80, and most preferably 100% by weight of the polymer be added prior to reaching an aqueous environment maximum viscosity during step (iii).

It may also be preferred that 20, preferably 50, more preferably 80, and most preferably 100% by weight of the polymer is added prior to reaching an aqueous environment conductivity drop associated with a conductivity curve inflection point slope of more than 45° during step (iii).

It may also be preferred that 20, preferably 50, more preferably 80, and most preferably 100% by weight of the polymer is added prior to reaching a pH value of less than 7.2 during step (iii).

In one embodiment, 20, preferably 50, more preferably 80, and most preferably 100% by weight of the polymer is added prior to step (iii).

It is possible that said CaO of step (i) is partially or fully slaked by addition of slaking water to form a slaked lime suspension prior to step (iii). In such a case, 20, preferably 50, more preferably 80, and most preferably 100% by weight of the polymer may be added to said slaking water.

In another embodiment, 20, preferably 50, more preferably 80, and most preferably 100% by weight of the polymer is added to the already slaked lime suspension prior to step (iii).

Preferred Embodiments Relative to the Step (iii):

As regards step (iii), $CO_2$-comprising gas may be bubbled through the aqueous environment until this environment has a pH drop to 7.5, and preferably to 7.2.

$CO_2$-comprising gas may be bubbled through the aqueous environment until this environment has a conductivity drop. As shown in the Examples herebelow, to ensure a maximum of PCC is formed, it may also be of interest to continue bubbling the $CO_2$-comprising gas through the slurry for some time following this conductivity drop.

It is preferred that this $CO_2$-comprising gas be provided to the reactor at an overpressure of at least 0.1, preferably of at least 0.2, more preferably of at least 0.3, even more preferably of at least 0.4 and most preferably of at least 0.6 bar relative to the pressure in said reactor.

The pressure in the reactor is generally between 50 mbar and 25 bar, and preferably is 1 bar.

The volume fraction of $CO_2$ in said $CO_2$-comprising gas is generally greater than 4%. As shown in the Examples, the skilled man may indeed even wish to vary the $CO_2$ content of this gas over the carbonation time.

The rate of $CO_2$-comprising gas introduction may also be adapted by the skilled man. In general, it is greater than or equal to 100 m$^3$/h.

The $CO_2$ gas of said $CO_2$-comprising gas may be "fresh" $CO_2$ according to FR 2 885 899.

The $CO_2$ gas might even be obtained from dry ice.

Preferred Embodiments Relative to Other Aspects of the Process:

The skilled man will know to adapt his process conditions (such as temperature, use of seeds or additional additives prior to and/or during step (iii)) to the quality of his starting materials according to the PCC polymorph he intends to produce. The skilled man will know, among other parameters, to adapt his reactor volume and the solids content of Ca(OH)$_2$ suspension, the $CO_2$ partial pressure in feed gas, gas feed rate and $CO_2$ yield (reactor efficiency) according to the product he desires.

He might grind CaO and/or the Ca(OH)$_2$ suspension, optionally before and/or during the addition of the polymer.

He might elect to add dry CaO to already slaked lime prior to carbonation in order to increase the solids of the Ca(OH)$_2$ suspension.

He may run the process of the present invention as a continuous or batch process.

He may adapt the aqueous environment agitation rate, though this generally lies between 200 to 300 rpm during step (iii).

Following the obtention of the PCC-comprising suspension in step (iv), he may wish to concentrate this suspension by mechanical and/or thermal concentration. During such a concentration, it may be advantageous to add dispersing additives, such as common polyacrylates.

It is of note that should additional polymer according to the present invention be implemented as a dispersant during steps (v) and (vi), less must be added than when concentrating a PCC-comprising suspension not obtained by the present invention.

Said PCC of step (iv) may also be dried.

Product-by-Process

The present invention also lies in the aqueous suspension from the inventive process.

The present invention also lies in a dry product obtained by drying the aqueous suspension from the inventive process.

As regards this dry product, it generally features the same or less residual calcium hydroxide as a product obtained by the same process but in the absence of said polymer, the residual lime content being determined by XRD analysis. Indeed, it is among the advantages of the present invention that the degree of conversion of calcium hydroxide to PCC is not negatively affected.

Moreover, this dry product may contain less than 6%, and preferably less than 3%, by weight relative to the weight of the total product weight, of residual calcium hydroxide.

Use of the Product-by-Process

The PCC-comprising suspension or dry product obtained following the process of the present invention finds applications in paper, paint or plastic, and especially in paper or plastic.

EXAMPLES

Example 1

In the Tests below, PCC was synthesised by bubbling a $CO_2$-comprising gas through a suspension of calcium hydroxide.

Additives according to the prior art and according to the process of the invention were implemented. The following prior art additives were used:

PAA is a sodium polyacrylate with a molecular weight of about 10 500 g/mol

PEG is a polyethylene glycol with a molecular weight of about 600 g/mol

The following additive according to the process of the invention was used:

Polymer P is a polymer resulting from the polymerisation of the following monomers (expressed in % monomer units of each constituent):

monomer a) 79.8% of methacrylic acid and 9.0% of ethyl acrylate monomer b) 11.2% of a monomer featuring a vinyl group on which:

a first substituent consists of Formula (I), wherein:

R=ester function;

R'=methyl group;

m=0;

p=0;

n=45;

q=1;

a second substituent consists of a methyl group;

the first and second substituents above are in trans-position relative to one another.

The efficiency of the PCC production process was determined according to the weight of PCC produced (in kg) relative to both carbonation time (in hours) and final PCC suspension weight (in kg).

The obtained precipitated calcium carbonate polymorph was determined by visual analysis of the SEM images of the product.

The particle size characteristics of the obtained PCC (median diameter ($d_{50}$), where the value $d_x$ represents the diameter relative to which X % by weight of the particles have a diameter less than $d_x$) was determined based on measurements made using Sedigraph™ 5100 instrumentation from MICROMERITICS™.

The specific surface area (in m²/g) of the obtained PCC was determined using the BET method, according to ISO 9277: 1995.

The Brookfield™ viscosity of the final PCC suspension was measured at 25° C. under 100 rpm ($\mu_{12}$).

Residual lime content in the obtained PCC was determined by XRD analysis.

Test 1 (Reference Process for the Production of Scalenohedral PCC)

200 kg of calcium oxide (origin: Austria) were added to 1 700 liters of 40° C.-tap water in a stirred reactor; the reactor contents were mixed under continuous stirring for 30 minutes. The resulting suspension of calcium hydroxide was diluted with water to obtain a suspension featuring a dry weight of calcium hydroxide as listed in Table 1.

1 750 liters of this calcium hydroxide suspension was then brought to a temperature of 50° C. and directed into a 1 800 liter cylindrical stainless steel reactor equipped with an agitator and probes monitoring the pH and conductivity of the suspension.

A gas of 20-30% by volume of $CO_2$ in air was then bubbled upwards through the suspension at a rate of 200 m³/h under a suspension agitation of between 200 and 300 rpm. Overpressure in gas feed was 150-200 mbar, corresponding to hydrostatic pressure of $Ca(OH)_2$ suspension in the reactor.

During carbonation, the temperature of the suspension was not controlled and allowed to rise due to the heat generated in the exothermic precipitation reaction.

After conductivity reached a minimum, gassing was continued for another 4 minutes and then stopped. The final product had a residual lime content of less than 6% by weight relative to the weight of the final PCC product.

Carbonation time, representing the time elapsed between the start of gas introduction and reaching a conductivity minimum, and other product and process conditions, are given in Table 1.

Test 2 (Prior Art Process for the Production of Scalenohedral PCC)

This test was run under the same conditions as Test 1, according to the conditions listed in Table 1, with the addition of PAA to the $Ca(OH)_2$ suspension prior to carbonation in an amount listed in Table 1.

Results are given in Table 1.

Test 3 (Process According to the Invention for the Production of Scalenohedral PCC)

This test was run under the same conditions as Test 1, according to the conditions listed in Table 1, with the addition of Polymer P to the $Ca(OH)_2$ suspension prior to carbonation in an amount listed in Table 1.

The final PCC product had a residual lime content of less than 6% by weight. Other results are given in Table 1.

Test 4 (Reference Process for the Production of Aragonitic PCC)

160 kg of calcium oxide (origin: USA) were added to 1 300 liters of 50° C.-tap water in a stirred reactor; the reactor contents were mixed under continuous stirring for 30 minutes. The resulting suspension of calcium hydroxide was diluted with water to obtain a suspension featuring a dry weight of calcium hydroxide as listed in Table 1.

1 250 liters of this calcium hydroxide suspension was then brought to a temperature of 60° C. and directed into a 1 800 liter cylindrical stainless steel reactor equipped with an agitator and probes monitoring the pH and conductivity of the suspension as well as the $CO_2$ content of the exhaust gas.

Before start of carbonation, aragonite structure-promoting seed was added to the calcium hydroxide suspension.

A gas of 4-8% by volume of $CO_2$ in air was then bubbled upwards through the suspension at a rate of 100 m³/h under a suspension agitation of 200 to 300 rpm during 15 minutes, calculated from start of introduction of said gas. Thereafter, the $CO_2$ volume fraction in the gas was augmented to 20-30% under the same conditions until the end of the carbonation. Overpressure in gas feed was 100-150 mbar, corresponding to hydrostatic pressure of $Ca(OH)_2$ suspension in the reactor.

When the $CO_2$-content in the exhaust gas exceeded 6% by volume, hot dilution water, in an amount listed in Table 1, was added continuously into the reactor to obtain the viscosity listed in Table 1.

During carbonation, the temperature of the suspension was not controlled and allowed to rise due to the heat generated in the exothermic precipitation reaction.

After conductivity reached a minimum, gassing was continued for another 4 minutes and then stopped. The final product had a residual lime content of less than 6% by weight relative to the weight of the final PCC product.

Carbonation time, representing the time elapsed between the start of gas introduction and reaching a conductivity minimum, and other product and process conditions are given in Table 1.

Test 5 (Process According to the Invention for the Production of Aragonitic PCC)

This test was run under the same conditions as Test 4, according to the conditions listed in Table 1, with the addition of Polymer P to the water subsequently added to calcium oxide to form the calcium hydroxide suspension, in an amount listed in Table 1.

The final PCC product had a residual lime content of less than 6% by weight. Other results are given in Table 1.

Test 6 (Process According to the Invention for the Production of Aragonitic PCC)

This test was run under the same conditions as Test 4, according to the conditions listed in Table 1, with the addition of Polymer P to the calcium hydroxide suspension prior to commencing carbonation, in an amount listed in Table 1.

The final PCC product had a residual lime content of less than 6% by weight. Other results are given in Table 1.

Test 7 (Process According to the Invention for the Production of Aragonitic PCC)

This test was run under the same conditions as Test 4, according to the conditions listed in Table 1, with the addition of Polymer P to the calcium hydroxide suspension prior to commencing carbonation, in an amount listed in Table 1.

The final PCC product had a residual lime content of less than 6% by weight. Other results are given in Table 1.

Test 8 (Process According to the Invention for the Production of Aragonitic PCC)

This test was run under the same conditions as Test 4, according to the conditions listed in Table 1, with the addition of Polymer P to the calcium hydroxide suspension prior to commencing carbonation, in an amount listed in Table 1.

The final PCC product had a residual lime content of less than 6% by weight. Other results are given in Table 1.

Test 9 (Reference Process for the Production of Aragonitic PCC)

160 kg of calcium oxide (origin: Austria) were added to 1 300 liters of 50° C.-tap water in a stirred reactor; the reactor contents were mixed under continuous stirring for 30 minutes. The resulting suspension of calcium hydroxide was diluted with water to obtain a suspension featuring a dry weight of calcium hydroxide as listed in Table 1.

1 250 liters of this calcium hydroxide suspension was then brought to a temperature of 60° C. and directed into a 1 800 liter cylindrical stainless steel reactor equipped with an agitator and probes monitoring the pH and conductivity of the suspension as well as the $CO_2$ content of the exhaust gas.

Before the start of carbonation, aragonite structure-promoting seed was added to the calcium hydroxide suspension.

A gas of 4-8% by volume of $CO_2$ in air was then bubbled upwards through the suspension at a rate of 100 m$^3$/h under a suspension agitation of 200 to 300 rpm during 15 minutes, calculated from start of introduction of said gas. Thereafter, the $CO_2$ volume fraction in the gas was augmented to 20-30% under the same conditions until the end of the carbonation. Overpressure in gas feed was 100-150 mbar, corresponding to hydrostatic pressure of $Ca(OH)_2$ suspension in the reactor.

When the $CO_2$-content in the exhaust gas exceeded 6% by volume, hot dilution water, in an amount listed in Table 1, was added continuously into the reactor to obtain the viscosity listed in Table 1.

Carbonation time, representing the time elapsed between the start of gas introduction and reaching a conductivity minimum, and other product and process conditions, are given in Table 1.

Test 10 (Process According to the Invention for the Production of Aragonitic PCC)

This test was run under the same conditions as Test 9, according to the conditions listed in Table 1, with the addition of Polymer P to the calcium hydroxide suspension prior to commencing carbonation, in an amount listed in Table 1.

The final PCC product had a residual lime content of less than 6% by weight. Other results are given in Table 1.

Test 11 (Prior Art Process for the Production of Aragonitic PCC)

This test was run under the same conditions as Test 9, according to the conditions listed in Table 1, with the addition of PEG to the calcium hydroxide suspension prior to commencing carbonation, in an amount listed in Table 1.

Results are given in Table 1.

TABLE 1

| Test | Additive | Additive added in % dry weight relative to dry weight $Ca(OH)_2$ | Dry weight $Ca(OH)_2$ on suspension weight (%) | Volume of $Ca(OH)_2$ suspension (L) | Carbonation time (min) | kg dry weight $Ca(OH)_2$ | Theoretical weight PCC produced (kg) |
|---|---|---|---|---|---|---|---|
| 1 | none | none | 13.2 | 1750 | 65 | 245 | 331 |
| 2 | PAA | 0.100 | 13.0 | 1750 | 74 | 242 | 327 |
| 3 | Polymer P | 0.075 | 13.2 | 1750 | 54 | 245 | 331 |
| 4 | none | none | 12.8 | 1250 | 65 | 170 | 230 |
| 5 | Polymer P | 0.075 | 13.3 | 1250 | 59 | 176 | 238 |
| 6 | Polymer P | 0.075 | 12.8 | 1250 | 54 | 170 | 230 |
| 7 | Polymer P | 0.150 | 13.2 | 1250 | 62 | 175 | 236 |
| 8 | Polymer P | 0.200 | 12.9 | 1250 | 63 | 171 | 231 |
| 9 | none | none | 13.5 | 1250 | 66 | 179 | 242 |
| 10 | Polymer P | 0.100 | 13.6 | 1250 | 65 | 180 | 243 |
| 11 | PEG | 0.100 | 13.1 | 1250 | 64 | 174 | 235 |

| Test | Added water to obtain desired PCC suspension viscosity (L) | PCC suspension viscosity (mPas) (Brookfield DV II, 100 rpm, Spindle 2) | kg final PCC suspension | kg dry PCC produced/ (carbonation time (hours) * kg PCC suspension) | PCC polymorph | $d_{50}$ (μm) | SSA BET (m$^2$/g) |
|---|---|---|---|---|---|---|---|
| 1 | none | 23 | 1994 | 0.15 | S-PCC | 2.36 | 4.1 |
| 2 | none | 18 | 2070 | 0.13 | S-PCC | 2.32 | 4.5 |
| 3 | none | 15 | 2122 | 0.17 | S-PCC | 2.25 | 5.8 |
| 4 | 350 | 340 | 1853 | 0.11 | A-PCC | 1.48 | 10.3 |
| 5 | 350 | 260 | 1711 | 0.14 | A-PCC | 1.80 | 8.5 |
| 6 | 100 | 200 | 1584 | 0.16 | A-PCC | 1.80 | 9.4 |
| 7 | none | 299 | 1425 | 0.16 | A-PCC | 1.91 | 8.9 |
| 8 | none | 255 | 1384 | 0.16 | A-PCC | 1.98 | 8.6 |
| 9 | 450 | 220 | 1920 | 0.11 | A-PCC | 1.51 | 9.3 |
| 10 | 50 | 215 | 1492 | 0.15 | A-PCC | 1.95 | 8.4 |
| 11 | 150 | 228 | 1656 | 0.13 | A-PCC | 1.98 | 9.1 |

During carbonation, the temperature of the suspension was not controlled and allowed to rise due to the heat generated in the exothermic precipitation reaction.

After conductivity reached a minimum, gassing was continued for another 4 minutes and then stopped. The final product had a residual lime content of less than 6% by weight relative to the weight of the final PCC product.

In the above Table, the reference "S-PCC" indicates a PCC of essentially scalenohedral polymorph, as determined according to an SEM image of the product. The reference "A-PCC" refers to an essentially aragonitic PCC product according to SEM images.

The results of Table 1 clearly demonstrate that only the process according to the present invention leads to a high PCC production rate relative to the carbonation time and final PCC suspension weight, without compromising the nature of the PCC polymorph or other PCC characteristics, relative to the same process run in absence of the polymer according to the invention.

The invention claimed is:
1. A process for preparing a precipitated calcium carbonate (PCC) comprising the following steps:
   (i) providing CaO, which is optionally partially or fully slaked;
   (ii) providing a $CO_2$-comprising gas;
   (iii) contacting the CaO of step (i) and the $CO_2$-comprising gas of step (ii) in an aqueous environment in a reactor, in one or more steps, in the presence of a polymer to obtain a PCC-comprising suspension;
   (iv) obtaining the PCC-comprising suspension from step (iii);
   (v) optionally concentrating the PCC-comprising suspension of step (iv); and
   (vi) optionally adding dispersing additives to the suspension of step (iv) and/or (v);
   wherein the polymer results from the polymerization of the following monomers present in the polymer in the following % monomer units relative to the total monomer units forming said polymer:
   a) from 50% to 98% of at least one vinyl group-comprising monomer not comprising Formula (I),
   b) from 2% to 50% of at least one vinyl group-comprising monomer having at least one substituent comprising Formula (I):

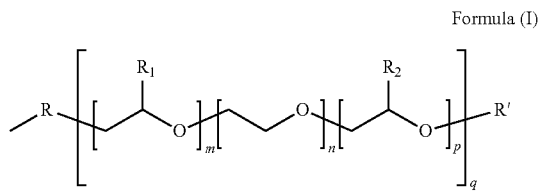

Formula (I)

wherein:
   m, n, p and q are whole numbers having a value of less than 150, and at least one of m, n, p and q has a value of greater than 0, such that $25 \leq (m+n+p)q \leq 150$;
   R represents a functional linking group selected from ethers, esters or amides,
   $R_1$ and $R_2$ are the same or different, and represent hydrogen or alkyl groups having 1 to 4 carbon atoms,
   R' represents hydrogen or a hydrocarbon radical having 1 to 40 carbon atoms, the sum of the monomer unit percentages of monomers a) and b) being equal to 100%.

2. The process according to claim 1, wherein the polymer results from polymerization of a) from 80% to 97% of at least one vinyl group-comprising monomer not comprising Formula (I), and b) from 3% to 20% of at least one vinyl group-comprising monomer having at least one substituent comprising Formula (I).

3. The process according to claim 1, wherein the polymer results from polymerization of a) from 85% to 95% of at least one vinyl group-comprising monomer not comprising Formula (I), and b) from 5% to 15% of at least one vinyl group-comprising monomer having at least one substituent comprising Formula (I).

4. The process according to claim 1, wherein in Formula (I), at least one of m, n, p and q has a value of greater than 0, such that $50 \leq (m+n+p)q \leq 150$.

5. The process according to claim 1, wherein in Formula (I), R' represents hydrogen or a hydrocarbon radical having 1 to 3 carbon atoms.

6. The process according to claim 1, wherein in Formula (I), R' is a methyl radical or hydrogen.

7. The process according to claim 1, wherein monomer a) is selected from the group consisting of an anionic monomer, acrylic acid, methacrylic acid, maleic acid, a cationic monomer, an acrylamide, a methacrylamide, a neutral monomer, an acrylic acid ester, a methacrylic acid ester, a maleic acid esters, and any mixture thereof.

8. The process according to claim 1, wherein monomer a) is a mixture of an anionic monomer and a neutral monomer.

9. The process according to claim 1, wherein monomer a) is a mixture of an anionic monomer and a neutral monomer at a monomer unit ratio of anionic monomers:neutral monomers is from 50:50 to 2:1.

10. The process according to claim 1, wherein monomer a) is a mixture of an anionic monomer and a neutral monomer at a monomer unit ratio of anionic monomers:neutral monomers is from 8:1 to 12:1.

11. The process according to claim 1, wherein monomer a) is a mixture of an anionic monomer and a neutral monomer at a monomer unit ratio of anionic monomers:neutral monomers is 10:1.

12. The process according to claim 1, wherein monomer a) is a mixture of an anionic and a neutral monomer(s) selected from among acrylic and/or methacrylic acids and esters thereof.

13. The process according to claim 1, wherein monomer a) is a cationic monomer(s) selected from the group consisting of cationic (meth)acrylic esters, and chloride and/or sulfate salts of one or more of the following: [2-(methacryloyloxy) ethyl]trimethyl ammonium, [3-acrylamido)propyl]trimethylammonium, dimethyl diallyl ammonium, [3-(methacrylamido)propyl]trimethylammonium.

14. The process according to claim 1, wherein monomer b) includes additional substituents not comprising Formula (I) selected from one or more of the following functional groups: alkyl, aryl, alkyl ester, hydrogen, alkyl amide, carboxyl and allyl.

15. The process according to claim 14, wherein the additional substituents is at least one methyl substituent.

16. The process according to claim 1, wherein monomer b) has a methyl group in trans-position relative to the substituent comprising Formula (I) in which the functional group linking is an ester.

17. The process according to claim 1, wherein the polymer is added in an amount totaling 0.01% to 0.5% by dry weight relative to the dry weight of PCC obtained in step (iv).

18. The process according to claim 1, wherein the polymer is added in an amount totaling 0.05% to 0.2% by dry weight relative to the dry weight of PCC obtained in step (iv).

19. The process according to claim 1, wherein the polymer has an intrinsic viscosity of less than or equal to 100 ml/g.

20. The process according to claim 1, wherein the polymer is fractionated in doses added over time prior to and/or during step (iii).

21. The process according to claim 1, wherein the polymer is added during more than one of steps (i), (ii) and (iii).

22. The process according to claim 1, wherein more than 80% by weight of the polymer is added prior to reaching an aqueous environment maximum viscosity during step (iii).

23. The process according to claim 1, wherein more than 80% of the polymer is added prior to reaching an aqueous environment conductivity drop associated with a conductivity curve inflection point slope of more than 45° during step (iii).

24. The process according to claim 1, wherein more than 80% by weight of the polymer is added prior to reaching a pH value of less than 7.2 during step (iii).

25. The process according to claim 1, wherein more than 80% of the polymer is added prior to step (iii).

26. The process according to claim 1, wherein the CaO of step (i) is partially or fully slaked by addition of slaking water to form a slaked lime suspension prior to step (iii).

27. The process according to claim 26, wherein more than 80% of the polymer is added to the slaking water.

28. The process according to claim 26, wherein 100% of the polymer is added to the slaking water.

29. The process according to claim 26, wherein 100% by weight of the polymer is added to the slaked lime suspension prior to step (iii).

30. The process according to claim 1, wherein the contacting of the CaO and the $CO_2$-comprising gas in step (iii) is performed until the conductivity of the aqueous environment drops.

31. The process according to claim 1, wherein the contacting of the CaO and the $CO_2$-comprising gas in step (iii) until an aqueous environment pH of 7.5 is reached.

32. The process according to claim 1, wherein the contacting of the CaO and the $CO_2$-comprising gas in step (iii) until an aqueous environment pH of 7.2 is reached.

33. The process according to claim 1, wherein the $CO_2$-comprising gas is provided in step (iii) at an overpressure of at least 0.1 bar relative to the pressure in said reactor.

34. The process according to claim 1, wherein the $CO_2$-comprising gas is provided in step (iii) at an overpressure of at least 0.6 bar relative to the pressure in said reactor.

35. The process according to claim 1, wherein the PCC-comprising suspension of step (iv) is concentrated by mechanical and/or thermal concentration.

36. The process according to claim 1, wherein the PCC of step (iv) is dried.

37. The process according to claim 1, wherein monomer a) comprises methacrylic acid and ethyl acrylate, and monomer b) comprises (i) a first substituent consisting of Formula (I), wherein R is an ester function, R' is a methyl group, m is 0, p is 0, n is 45, and q is 1; and (ii) a second substituent consisting of a methyl group, and wherein the first and second substituents of monomer b) are in trans-position relative to one another.

* * * * *